United States Patent

Takasaki et al.

[11] Patent Number: 5,914,206
[45] Date of Patent: Jun. 22, 1999

[54] COLOR FILTER AND BLACK RESIST COMPOSITION

[75] Inventors: Ryuichiro Takasaki; Shingo Ikeda; Fumiyuki Matsuo; Shin Kawana; Yasuyuki Taniguchi, all of Yokohama, Japan

[73] Assignee: Mitsubishi Chemical Corporation, Tokyo, Japan

[21] Appl. No.: 08/885,942

[22] Filed: Jun. 30, 1997

[30] Foreign Application Priority Data

| Jul. 1, 1996 | [JP] | Japan | 8-171355 |
| Nov. 29, 1996 | [JP] | Japan | 8-319859 |
| Feb. 28, 1997 | [JP] | Japan | 9-045975 |
| Apr. 24, 1997 | [JP] | Japan | 9-107329 |

[51] Int. Cl.$^6$ .............................. G03F 7/004; G02B 5/20
[52] U.S. Cl. ..................... 430/7; 430/270.1; 430/287.1
[58] Field of Search ....................... 430/7, 270.1, 287.1; 349/106, 110

[56] References Cited

U.S. PATENT DOCUMENTS

| 4,772,096 | 9/1988 | Kai et al. . |
| 5,187,229 | 2/1993 | Yamamoto et al. . |
| 5,516,606 | 5/1996 | Sato et al. . |

FOREIGN PATENT DOCUMENTS

| 0 535 224 | 4/1993 | European Pat. Off. . |
| 0 627 663 | 12/1994 | European Pat. Off. . |
| 1-237502 | 9/1989 | Japan . |
| 3-105317 | 5/1991 | Japan . |
| 4-190362 | 7/1992 | Japan . |
| 6-9915 | 1/1994 | Japan . |
| 6-35188 | 2/1994 | Japan . |
| 8-034923 | 2/1996 | Japan . |
| 8-157736 | 6/1996 | Japan . |
| 9-15419 | 1/1997 | Japan . |
| 9-22653 | 1/1997 | Japan . |
| 9-33715 | 2/1997 | Japan . |
| 9-33716 | 2/1997 | Japan . |
| 9-80220 | 3/1997 | Japan . |

OTHER PUBLICATIONS

Patent Abstracts of Japan, vol. 18, No. 236 (C–1196), May 6, 1994, JP 06 025432, Feb. 1, 1994.
Patent Abstracts of Japan, vol. 96, No. 5, May 31, 1996, JP 08 005829, Jan. 12, 1996.

*Primary Examiner*—John A. McPherson
*Attorney, Agent, or Firm*—Oblon, Spivak, McClelland, Maier & Neustadt, P.C.

[57] ABSTRACT

A color filter having a resin black matrix on a transparent substrate, wherein the resin black matrix has a 20° specular glossiness of from 100 to 200.

33 Claims, No Drawings

COLOR FILTER AND BLACK RESIST COMPOSITION

The present invention relates to a color filter which is to be used in combination with a liquid crystal display device or a solid image pick-up device, and a resist composition used for its production. Particularly, the present invention relates to a color filter having a resin black matrix and a composition suitable for a black resist for forming a black pattern that is the black matrix.

A color filter is one having minute colored picture elements of red, green, blue, etc. formed on a glass substrate by a dyeing method, a printing method, an electro-deposition method, a pigment dispersion method or the like. There known methods have the following characteristics and problems.

A color filter by a dyeing method is produced in such a manner that an image is formed by a photosensitive resin prepared by mixing a dichromate as a photosensitive material to gelatin or polyvinyl alcohol, followed by dyeing. To form multi-colors on the same substrate, reserve printing steps are required, whereby there is a problem that the process tends to be complex. Further, since dyes are used, it is poor in light resistance. The dichromate used as a photosensitive material is problematic also from the viewpoint of prevention of pollution.

A color filter by a printing method is prepared by transferring a heat-curable or photo-curable ink onto a glass substrate by such a method as screen printing or flexographic printing. The process is simple without necessity of dyeing or forming an image. However, a highly fine image can not be obtained thereby, and there is a problem in flatness of the ink.

A color filter by an electro-deposition method is prepared by immersing a glass substrate provided with electrodes, in a bath containing a pigment or dye, whereby a color phase is deposited on the substrate by electrophoresis. It is excellent in flatness, but it is difficult to form a complicated pattern, since it is necessary to provide electrodes to the glass substrate beforehand.

In the pigment dispersion method, an image is formed by a colored resist having a pigment dispersed in a photo-curable resin. It has a merit such as high heat resistance or no necessity of dyeing, and it is capable of forming a highly precise image. As compared with the above production method, the pigment dispersion method is excellent in view of production cost and quality, and accordingly this method is currently the most popular method for producing color filters.

Further, in order to improve contrast among red, blue and green colored images, it is general to place a lattice-like black pattern called as a black matrix. Heretofore, the black matrix was formed by vapor-depositing chromium on the whole part of a glass substrate and forming a pattern by etching treatment, but the use of chromium provided various problems of high cost, high reflectance and waste liquid treatment. Thus, a resin black matrix formed by a photosensitive resin has been studied.

The resin black matrix is image-formed by a photosensitive composition having a dispersion of a black pigment such as carbon black or a mixture of pigments colored black by mixing some kinds of pigments. In order to provide a high light-shielding property, it is necessary to blend a large amount of pigments, but when a pigment blending ratio becomes high, dispersion of pigments becomes difficult and various properties including developing property, resolution, adhesiveness and stability are degraded. Thus, a resin black matrix having a satisfactory light-shielding property has not been commercialized up to now.

Thus, an object of the present invention is to provide a black resist composition for a color filter excellent in developing property, resolution, adhesiveness and stability and having a large development latitude. Further, another object of the present invention is to produce a color filter excellent in quality and safety at a low cost by providing a resist composition suitable for forming a black matrix having a satisfactory light-shielding property without impairing the above-mentioned properties.

The present inventors have fully studied and found that a glossiness can be used as a standard for showing dispersion state of solid components such as pigments in a resin black matrix. When the glossiness of the black matrix is in the range of predetermined aimed values, the dispersion state is satisfactory, and as this result, resolution, size-stability and adhesiveness to a substrate become satisfactory, and also in the color filter having such a resin black matrix, an ITO film is satisfactorily vapor-deposited thereon.

Further, the present inventors have found that a black resist having a predetermined aimed viscosity property is effective for forming the above resin black matrix.

Still further, the present inventors have found that a black resist containing a specific dispersant is excellent in resolution, adhesiveness to a substrate and stability and provides a wide development latitude in the formation of a black matrix, and that a resin black matrix formed by the above black resist has a high light-shielding rate.

Thus, the first essential feature of the present invention resides in a color filter having a resin black matrix on a transparent substrate, characterized in that the resin black matrix has a 20° specular glossiness of from 100 to 200.

The second essential feature of the present invention resides in a black resist composition for forming a black matrix, which comprises a black pigment, a photosensitive resin material and a solvent, characterized in that its dry coating film has a 20° specular glossiness of from 100 to 200.

Hereinafter, the present invention is further described in more details.

First, the present invention is described with regard to a color filter which is the first essential feature of the present invention. The color filter of the present invention is characterized in that a resin black matrix provided on a transparent substrate has a 20° specular glossiness in the range of from 100 to 200.

The resin black matrix is a light-shielding film formed by a black resist comprising a resin and a black pigment as the main components, and the resin and the black pigment are not specially limited, but these are fully explained hereinafter with regard to a black resist.

The specular glossiness is a glossiness expressed by a reflection intensity in the regular reflective direction, and 20°, 45°, 60°, 75° and 85° specular glossinesses are known depending on samples to be measured (see, for example, Japanese Industrial Standard JIS X8741). In the present invention, since a sample to be measured is a resin black matrix, the glossiness is expressed by a 20° specular glossiness (corresponding to JIS Method 4, and also corresponding to ASTM 523-53T), and it is necessary for the present invention that the 20° specular glossiness (hereinafter simply referred to as "glossiness") should be in the range of from 100 to 200.

When the glossiness in this range, satisfactory resolution, size-stability and adhesiveness can be achieved and ITO can be satisfactorily vapor-deposited and a defective vapordeposition of ITO is hardly caused. When the glossiness is too low, resolution and adhesiveness to a substrate become poor and also an optical density becomes low, thus making a light-shielding performance poor. On the other hand, when the glossiness is too high, an unpreferable problem of light reflection by the black matrix is caused.

A resin black matrix of the color filter of the resent invention can be formed by using a black resist composition containing a photosensitive resin material, which is the second essential feature of the present invention as described below. In such a case, the glossiness is preferably from 120 to 200, more preferably from 130 to 200, in order to secure the stability of the composition (stability in image-forming ability after storing), and a wide development latitude (developing time allowance during forming the black matrix).

The resin black matrix of the color filter of the present invention has an optical density of usually at least 2.8, preferably at least 3.0, more preferably at least 3.5. According to the present invention, since solid components are satisfactorily dispersed in a mixture containing at least a resin, a black pigment and a solvent, resolution and adhesiveness are satisfactory although a large amount of a black pigment is contained to achieve the above aimed specific glossiness and the above high optical density.

Hereinafter, a black resist composition for a color filter, which is the second essential feature of the present invention, is described in more details. As mentioned above, the black resist composition of the present invention contains a black pigment, a photosensitive resin material and a solvent, and is characterized in that its dry coating film has a 20° specular glossiness in the range of from 100 to 200.

The photosensitive resin material used in the composition of the present invention usually contains (a) a binder resin, (b) a monomer curable by a photo-polymerization initiator and (c) a photo-polymerization initiator, and these are selected from a wide range of materials used for this type of resist.

(a) As the binder resin, any high molecular compound having a film-forming property can be used, examples of which are illustrated below.

1) Polyolefin type polymer:
   polyethylene, polypropylene, polyisobutylene, and the like.
2) Diene type polymer:
   polybutadiene, polyisoprene, and the like.
3) Polymer having a conjugated polyene structure:
   polyacetylene type polymer, polyphenylene type polymer, and the like.
4) Vinyl polymer:
   polyvinyl chloride, polystyrene, polyvinyl acetate, polyvinyl alcohol, polyacrylic acid, polyacrylate, polyacrylamide, polyacrylonitrile, polyvinyl phenol, and the like.
5) Polyether:
   polyphenylene ether, polyoxirane, polyoxetane, polytetrahydrofuran, polyether ketone, polyetherether ketone, polyacetal, and the like.
6) Phenol resin:
   novolak resin, resol resin, and the like.
7) Polyester:
   polyethylene terephthalate, polyphenolphthalene terephthalate, polycarbonate, alkyd resin, unsaturated polyester resin, and the like.
8) Polyamide:
   nylon-6, nylon-66, water soluble nylon, polyphenylene amide, and the like.
9) Polypeptide:
   gelatin, casein, and the like.
10) Epoxy resin and its modified material:
    novolak epoxy resin, bisphenol epoxy resin, novolak epoxy acrylate and acid anhydride-modified resin, and the like.
11) Others:
    polyurethane, polyimide, melamine resin, urea resin, polyimidazol, polyoxazol, polypyrol, polyaniline, polysulfide, polysulfone, celluloses, and the like.

Among these resins, a resin having a carboxyl group or a phenolic hydroxyl group in the side chain or the main chain is preferable in view of an environmental problem since a resist composition containing such a resin can be developed by an alkali developing solution. Particularly, a resin having a carboxyl group, such as acrylic acid (co)polymer, styrene/maleic anhydride resin or acid anhydride-modified resin of novolak epoxy acrylate, is preferable since these resins can be easily developed by an alkali developing solution.

Further, acryl type resin is preferable since it has an excellent developing property and can be formed into a various copolymers with various monomers, so that various properties and production can be easily controlled.

More particularly, examples of the acrylic resin containing a carboxyl group include polymers obtained by copolymerizing a carboxyl group-containing monomer such as (meth)acrylic acid, (anhydrous)maleic acid, crotonic acid, itaconic acid, fumaric acid, or the like, with a monomer such as styrene, α-methylstyrene, methyl (meth)acrylate, ethyl (meth)acrylate, propyl (meth)acrylate, isopropyl (meth)acrylate, butyl (meth)acrylate, vinyl acetate, acrylonitrile, (meth)acrylamide, glycidyl (meth)acrylate, allylglycidyl ether, glycidyl ethylacrylate, crotonic acid-glycidyl ether, (meth)acrylic acid chloride, benzyl (meth)acrylate, hydroxyethyl (meth)acrylate, N-methylol acrylamide, N,N-dimethylacrylamide, N-methacryloylmorpholine, N,N-dimethylaminoethyl(meth)acrylate, N,N-dimethylaminoethylacrylamide, or the like. Among them, a preferable example is an acrylic resin containing at least (meth)acrylic acid or (meth)acrylic acid alkyl ether as a constituent monomer, and a more preferable example is an acrylic resin containing, (meth)acrylic acid and styrene.

Also, these resins may have an ethylenic double bond added to a side chain. By having a double bond added to the side chain of resin, photo-curability is elevated, and consequently, resolution and adhesiveness are more improved. Examples of the method for introducing an ethylenic double bond include such methods as described in JP-B-50-34443 and JP-B-50-34444, for instance, a method of reacting a carboxyl group or a hydroxyl group with a compound having a glycidyl group, an epoxy cyclohexyl group and a (meth)acryloyl group or acrylic acid chloride. For example, a resin having a polymerizable group in the side chain can be obtained by reacting a compound such as glycidyl (meth)acrylate, allylglycidyl ether, glycidyl α-ethylacrylate, crotonyl glycidyl ether, (iso)crotonic acid-glycidyl ether, (3,4-epoxycyclohexyl)methyl (meth)acrylate, (meth)acrylic acid chloride or (meth)allyl chloride, with a resin having a carboxyl group or a hydroxyl group. Particularly, a resin obtained by reacting a cycloaliphatic epoxy compound such as (3,4-epoxycyclohexyl)methyl (meth)acrylate is preferable.

In the present specification, "(meth)acryl . . . " and " . . . (meth)acrylate" mean "acryl . . . or methacryl . . . " and " . . . acrylate or . . . methacrylate". For example, "(meth)acrylic acid" means "acrylic acid or methacrylic acid".

These acrylic resins have preferably a weight average molecular weight in the range of from 1,000 to 100,000 measured by GPC. When the weight average molecular weight is less than 1,000, it is difficult to obtain a uniform coating film. On the other hand, if the weight average molecular weight exceeds 100,000, a developing property tends to lower. Also, a preferable content of a carboxyl group is in the range of an acid value of from 5 to 200. If the acid value is less than 5, it becomes insoluble in an alkali developing solution. On the other hand, if the acid value exceeds 200, a sensitivity tends to be lowered.

(b) Examples of a monomer curable by the action of a photo-polymerization initiator include known monomers radical-polymerizable by the action of a radical generated by the photo-initiator, monomers addition-condensable by the action of an acid generated by the photo-initiator, and the like.

Typical examples of the radical-polymerizable monomers include monomers having an ethylenic double bond, more particularly isobutyl acrylate, t-butyl acrylate, lauryl acrylate, cetyl acrylate, stearyl acrylate, cyclohexyl acrylate, isobonyl acrylate, benzyl acrylate, 2-methoxyethyl acrylate, 3-methoxybutyl acrylate, ethylcarbitol acrylate, phenoxyethyl acrylate, tetrahydrofuryl acrylate, phenoxypolyethylene glycol acrylate, methoxypropylene glycol acrylate, 2-hydroxyethyl acrylate, 2-hydroxypropyl acrylate, 2-acryloyloxyethylhydrogen phthalate, 2-acryloyloxypropylhydrogen phthalate, 2-acryloyloxypropyltetrahydrohydrogen phthalate, morfolinoethyl methacrylate, trifluoroethyl acrylate, trifluoroethyl methacrylate, tetrafluoropropyl (meth)acrylate, hexafluoropropyl (meth)acrylate, octafluoropentyl (meth)acrylate, heptadecafluorododecyl acrylate, trimethylsiloxyethyl methacrylate, 1,4-butanediol diacrylate, 1,6-hexanediol diacrylate, 1,9-nonanediol diacrylate, neopentylglycol diacrylate, tetraethyleneglycol diacrylate, tripropylene glycol diacrylate, propylene glycol diacrylate, glycerin methacrylate acrylate, bisphenol A, ethylene oxide-added diacrylate, trimethylolpropylene triacrylate, pentaerythritol triacrylate, pentaerythritol tetraacrylate, trimethylolpropane ethylene oxide-added triacrylate, glycerinepropylene oxide-added triacrylate, trisacryloyloxyethylene phosphate, dipentaerythritol hexaacrylate, acrylic acid-modified material of novolak epoxy, acrylic acid and acid anhydride-modified material of novolak epoxy, N-vinyl pyrrolidone, N-vinyl caprolactone, acrylated isocyanurate, dipentaerythritolmonohydroxy pentaacrylate, urethane acrylate, unsaturated polyester acrylate, and the like.

Among these monomers, an acrylic monomer, particularly an acrylic monomer having at least 3 ethylenic double bonds, is preferable. These monomers are used alone or in combination of two or more monomers.

Also, examples of monomers addition-condensable by the action of an acid generated from the photo-initiator include formaldehyde-applied compounds of melamine, benzoguanamine, glycol uryl or urea, or their alkyl-modified compounds, or compounds having a crosslinking function of an epoxy compound and a resol compound, and the like.

More particular examples include Cymel 300, 301, 303, 350, 736, 738, 370, 771, 325, 327, 703, 701, 266, 267, 285, 232, 235, 238, 1141, 272, 254, 202, 1156 and 1158 (registered trademark) of Mitsui Cyanamid Company, which are formaldehyde-applied melamine compounds or their alkyl-modified materials. Further examples include Cymel 1123, 1125 and 1128 (trademark), which are formaldehyde-applied benzoguanamine compounds or their alkyl-modified materials. Still further examples include Cymel 1170, 1171, 1174 and 1172 (trademark), which are formaldehyde-applied glycol uryl compounds or their alkyl-modified materials. Further examples include UFR 65 and 300 (registered trademark) of Mitsui Cyanamid Compound, which are formaldehyde-applied urea compounds and their alkyl-modified materials.

Examples of epoxy compounds include triglycidyl trishydroxyethylisocyanurate, allylglycidylether, ethylhexylglycidyl ether, phenylglycidyl ether, phenolglycidyl ether, lauryl alcohol glycidyl ether, adipic acid glycidyl ether, phthalic acid glycidyl ether, dibromophenylglycidyl ether, dibromoneopentylglycol diglycidyl ether, glycidyl phthalimide, (poly)ethyleneglycol glycidyl ether, polypropylene glycol diglycidyl ether, neopentyl glycol diglycidyl ether, glycerin polyglycidyl ether, trimethylolpropane polyglycidyl ether, butylglycidyl ether, and the like.

Among them, a preferable example includes a compound having a —$N(CH_2OR)_2$ (R=a hydrogen atom or an alkyl group) in a molecule, more particularly, a formaldehyde-applied compound of urea or melamine or their alkyl-modified materials.

Examples of the resol compounds include PP-3000s, PP-3000A RP-2978, SP-1974, SP-1975, SP-1976, SP-1977, RP-3973 and the like, manufactured by Gunei Kagaku K. K.

Among these binder resins and monomers, a combination of an acrylic resin having a carboxyl group with an acrylic monomer is most preferable in respect that the resist composition for a color filter can be developed by an alkali developer.

(c) Any of known photo-initiators can be used, examples of which include a compound generating a radical to polymerize an ethylenic unsaturated group by UV ray and compound generating an acid by UV ray.

More concrete examples include halomethylated triazine derivatives such as 2-(4-methoxyphenyl)-4,6-bis(trichloromethyl)-s-triazine, 2-(4-methoxynaphthyl)-4,6-bis(trichloromethyl)-s-triazine, 2-(4-ethoxynaphthyl)-4,6-bis(trichloromethyl)-s-triazine, 2-(4-ethoxycarbonylnaphthyl)-4,6-bis(trichloromethyl)-s-triazine and the like; halomethylated oxadiazole derivatives; imidazole derivatives such as 2-(2'-chlorophenyl)-4,5-diphenylimidazole dimer, 2-(2'-chlorophenyl)-4,5-bis(3'-methoxyphenyl) imidazole dimer, 2-(2'-fluorophenyl)-4,5-diphenylimidazole dimer, 2-(2'-methoxyphenyl)-4,5-diphenylimidazole dimer, (4'-methoxyphenyl)-4,5-diphenylimidazole dimer and the like; benzoin, benzoin alkyl ethers such as benzoinmethyl ether, benzoinphenyl ether, benzoinisobutyl ether, benzoinisopropyl ether and the like; anthraquinone derivatives such as 2-methylanthraquinone, 2-ethylanthraquinoe, 2-t-butylanthraquinone, 1-chloroanthraquinone and the like; benzanthrone derivatives; benzophenone derivatives such as benzophenone, Michler's ketone, 2-methylbenzophenone, 3-methylbenzophenone, 4-methylbenzophenone, 2-chlorobenzophenone, 4-bromobenzophenone, 2-carboxybenzophenone and the like; acetophenone derivatives such as 2,2-dimethoxy-2-phenylacetophenone, 2,2-diethoxyacetophenone, 1-hydroxycyclohenxylphenyl ketone, α-hydroxy-2-methylphenylpropanone, 1-hydroxy-1-methylethyl-(p-isopropylphenyl) ketone, 1-hydroxy-1-(p-dodecylphenyl) ketone, 2-methyl-(4'-(methylthio)phenyl)-2-morpholino-1-propanone, 1,1,1-trichloromethyl-(p-butylphenyl) ketone and the like; thioxantone derivatives such as thioxantone, 2-ethylthioxanthone, 2-isopropylthioxanthone, 2-chlorothioxanthone, 2,4-dimethylthioxanthone, 2,4-diethylthioxanthone, 2,4-diisopropylthioxanthone and the like; benzoic acid ester derivatives such as ethyl p-dimethylaminobenzoate, ethyl p-diethylaminobenzoate and the like; acridine derivatives such as 9-phenylacridine, 9-(p-methoxyphenyl) acridine and the like; phenadine derivatives such as 9,10-dimethylbenzphenadine and the like; titanocene derivatives such as di-cyclopentadienyl-Ti-di-chloride, di-cyclopentadienyl-Ti-bis-phenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-2,4-di-fluorophen-1-yl, di-methylcyclopentadienyl-Ti-bis-2,3,4,5,6-pentafluorophen-1-yl, di-methylcyclopentadienyl-Ti-bis-2,6-di-fluorophen-1-yl, di-cyclopentadienyl-Ti-2,6-di-fluoro-3-(pyr-1-yl)-phen-1-yl, and the like. These photo-initiators are used respectively alone or in a combination of two or more. For example, the combinations of initiators are illustrated in JP-B-53-12802, JP-A-1-279903, JP-A-2-48664, JP-A-4-1648902, JP-A-6-75373, and the like.

Among these photo-initiators, halomethylated triazine derivatives, halomethylated oxadiazole derivatives, biimidazole derivatives and titanocene derivatives are particularly preferable since they have a high sensitivity, a high stability and a high solubility.

Examples of black pigments used in the present invention are not specially limited, and a plurality of well known red, green and blue organic pigments or inorganic pigments may be mixed to provide a black pigment. However, it is preferable to use carbon black, graphite or titan black having a strongly light-shielding performance. Among them, carbon black is particularly preferable.

Concrete examples (tradenames) of carbon black include carbon black #2400, #2350, #2300, #2200, #1000, #980, #970, #960, #950, #900, #850, MCF88, #650, MA600, MA7, MA8, MA11, MA100, MA220, IL30B, IL31B, IL7B, IL11B, IL52B, #4000, #4010, #55, #52, #50, #47, #45, #44, #40, #33, #32, #30, #20, #10, #5, CF9, #3050, #3150, #3250, #3750, #3950, Diablack A, Diablack N220M, Diablack N234, Diablack I, Diablack LI, Diablack II, Diablack N339, Diablack SH, Diablack SHA, Diablack LH, Diablack H, Diablack HA, Diablack SF, Diablack N550M, Diablack E, Diablack G, Diablack R, Diablack N760M, Diablack LR, etc. manufactured by Mitsubishi Chemical Corporation. Further examples (tradenames) of carbon black include carbon black Thermax N990, N991, N907, N908, N990, N991, N908, etc. manufactured by Cancurve Company. Still further examples (tradenames) of carbon black include carbon black Asahi #80, Asahi #70, Asahi #70L, Asahi F-200, Asahi #66, Asahi #66HN, Asahi #60H, Asahi #60U, Asahi #60, Asahi #55, Asahi #50H, Asahi #51, Asahi #50U, Asahi #50, Asahi #35, Asahi #15, Asahi Thermal, etc. manufactured by Asahi Carbon Company. Still further examples (tradenames) of carbon black include carbon black Color Black Fw 200, Color Black Fw2, Color Black Fw2V, Color Black Fw1, Color Black Fw18, Color Black S170, Color Black S160, Special Black 6, Special Black 5, Special Black 4, Special Black 4A, Special Black 250, Special Black 350, Printex U, Printex V, Printex 140U, Printex 140V, etc. manufactured by Degussa Company.

Among these carbon blacks, a particularly preferable one has physical properties of a specific surface area of at most 110 m²/g and a pH of from 2 to 9. When the specific surface area exceeds 110 m²/g, a large amount of a high molecular dispersant necessary for dispersion stability is required, but since such a high molecular dispersant is insoluble in a developer, a resolution and a developing property tend to be degraded. Further, when a pH value exceeds 9, a high molecular dispersant becomes hardly adsorbable and a dispersion stability becomes poor. On the other hand, if the pH value is less than 2, it is not practical since it becomes difficult to industrially produce such a carbon black.

Examples of a solvent used in the black resist composition of the present invention include organic solvents such as diisopropyl ether, mineral spirit, n-pentane, amyl ether, ethyl caprylate, n-hexane, diethyl ether, isoprene, ethyl isobutyl ether, butyl stearate, n-octane, Barsol #2, Apco #18 solvent, diisobutylene, amyl acetate, butyl butylate, apco thinner, butyl ether, diisobutyl ketone, methylcyclohexene, methyl nonyl ketone, propyl ether, dodecane, Socal solvent No. 1 and No. 2, amyl formate, dihexyl ether, diisopropyl ketone, Solvesso #150, butyl acetate, (n, sec, t), hexene, Shell TS28 solvent, butyl chloride, ethyl amyl ketone, ethyl benzoate, amylchloride, ethylene glycol diethyl ether, ethyl orthoformate, methoxymethyl pentanone, methyl butyl ketone, methyl hexyl ketone, methyl isobutylate, benzonitrile, ethyl propionate, methyl cellosolve acetate, methyl isoamyl ketone, methyl isobutyl ketone, propyl acetate, amyl acetate, amyl formate, bicyclohexyl, diethylene glycol monoethyl ether acetate, dipentene, methoxymethyl pentanol, methyl amyl ketone, methyl isopropyl ketone, propyl propionate, propylene glycol-t-butyl ether, methyl ethyl ketone, methylcellosolve, ethylcellosolve, ethylcellosolve acetate, carbitol, cyclohexanone, ethyl acetate, propylene glycol, propylene glycol monomethylether, propylene glycol monomethylether acetate propylene glycol monoethyl ether, propylene glycol monoethyl ether acetate, dipropylene glycol monoethyl ether, dipropylene glycol monomethyl ether, propylene glycol monoethyl ether acetate, dipropylene glycol monomethyl ether acetate, 3-methoxypropionic acid, 3-ethoxypropionic acid, ethyl 3-ethoxypropate, methyl 3-methoxypropionate, ethyl 3-methoxypropionate, propyl 3-methoxypronionate, butyl 3-methoxypropionate, diglyme, dipropylene glycol monomethyl ether, ethylene glycol acetate, ethyl carbitol, butyl carbitol, ethylene glycol monobutyl ether, propylene glycol-t-butyl ether, 3-methyl-3-methoxybutanol, tripropylene glycol methyl ether, 3-methyl-3-methoxybutyl acetate, and the like.

It is preferable to select a solvent having a boiling point in the range of from 100 to 200° C., more preferably from 120 to 170° C. These solvents may be used alone or in a mixture.

In addition to these components, the black resist composition of the present invention may further contain a pigment dispersant. The addition of the pigment dispersant is preferable in respect that a viscosity property and a glossiness can be easily controlled.

The pigment dispersant should have an affinity both with a pigment and a binder resin, examples of which include nonionic, cationic or anionic surfactants, high molecular dispersants and the like, and among them high molecular dispersants are preferable.

The blending ratio of respective components of the black resist composition of the present invention is generally from 20 to 470 parts by weight of a black pigment, from 90 to 9,500 parts by weight of a solvent and from 0 to 47 parts by weight of a high molecular dispersant to 100 parts by weight of a photosensitive resin material. More particularly, the black resist composition contains from 5 to 100 parts by weight of a monomer, from 0.01 to 30 parts by weight an initiator, from 50 to 500 parts by weight of a black pigment, from 200 to 10,000 parts by weight of a solvent and from 0 to 50 parts by weight of a high molecular dispersant to 100 parts by weight of a binder resin.

If the monomer amount is less than the above-mentioned range, a crosslinking density of an image part exposed to light is too insufficient to obtain a satisfactory image. On the other hand, if the monomer amount exceeds the above-mentioned range, a resist film becomes sticky and a workability is poor even after drying. If the photo-initiator amount is less than the above-mentioned range, a satisfactory sensitivity can not be obtained. On the other hand, if the photo-initiator amount exceeds the above-mentioned range, the photo-initiator sometimes precipitates out of the resist composition. If the black pigment amount is less than the above-mentioned range, a satisfactory color density can not be achieved and a light-shielding performance is poor. On the other hand, if the pigment amount exceeds the above-mentioned range, a pigment dispersion stability, a developing property, a resolution and an adhesiveness are lowered. If the solvent amount is less than the above-mentioned range, a coating non-uniformity tends to be caused and a uniform film thickness is hardly obtainable. On the other hand, if the solvent amount exceeds the above-mentioned range, a sufficient coating thickness can not be obtained and coating defects such as pinholes tend to be caused. Further, a black pigment concentration in total solid content is usually from 20 to 80 wt %, preferably from 25 to 75 wt %, more preferably from 35 to 75 wt %, most preferably from 45 to 75 wt %. In addition to these essential components, the composition of the present invention may further contain a sensitizer, a coating property-improving agent, a polymerization inhibitor, a plasticizer, a flame retardant, and the like. These components may be used alone or in a mixture of two or more components.

In the preparation of the black resist composition of the present invention, pigments are required to be previously subjected to fine dispersion treatment. The dispersion treatment can be carried out by using a ball mill, a sand mill, a beads mill, a three roll mill, a paint shaker, a supersonic device, a bubble homogenizer or the like. It is possible to combine two or more of these treatment methods. It is preferable to carry out the dispersion treatment by using a composition prepared by adding a solvent to a pigment and a pigment dispersant or a binder resin. It is not preferable to carry out the dispersion treatment by using a composition containing all of the essential components for the resist since there is a fear that properties of highly reactive components such as an initiator, a monomer and the like are changed. Thus, it is preferable to add and to dissolve the changeable components after the dispersion treatment. A pigment obtained by the dispersion treatment preferably has a particle size of from 0.005 to $0.7\mu$, more preferably from 0.01 to $0.5\mu$, in the case of carbon black. The particle size of carbon black is measured by a laser Doppler system particle size measurement device. When the particle size exceeds the above-mentioned range, a developing property, a resolution and a stability are degraded. On the other hand, in order to make the particle size lower than the above-mentioned range, it is necessary to reduce the pigment particle size to the same level as the primary particle size of carbon black or finer, and therefore, its production becomes remarkably difficult.

It is necessary for the black resist composition thus obtained to provide its dry coating film having a 20° specular glossiness in the range of from 100 to 200. Such a glossiness can be measured by coating the black resist composition of the present invention on a transparent substrate in accordance with the following image-formation method to form a dry coating film and measuring its glossiness.

The glossiness which is the essential feature of the present invention, can be controlled by appropriately selecting chemical structures, addition amounts and dispersion treatment conditions of the above-mentioned respective components.

One preferable embodiment for achieving the aimed specific glossiness of the present invention is to provide a black resist composition having a viscosity at 25° C. in the range of from 2 to 20 mPs and a viscosity ratio $\eta 5/\eta 50$ (of viscosities measured respectively at 5 rpm and 50 rpm revolutions) in the range of from 1 to 1.5.

In such a case, the control of glossiness and viscosity by the dispersion conditions is carried out, for example, by the following manner. Usually, a glossiness and a viscosity change depending on a dispersion time in such manner that a low glossiness and a high viscosity are provided at the initial stage of dispersion, that the glossiness rises and the viscosity and the $\eta 5/\eta 50$ ratio are lowered in proportion to the procedure of dispersion, and that when the dispersion further proceeds, the dispersion becomes perdispersed state and the glossiness is saturated and the viscosity and the $\eta 5/\eta 50$ ratio tend to rapidly rise. However, the maximum glossiness is considered to change depending on the components of the composition. Thus, it is possible to obtain a pigment dispersion and a resist composition having satisfactory glossiness and a satisfactory viscosity property by fixing a dispersion time in such manner as to provide the maximum glossiness and the minimum viscosity.

With regard to the control by the resist components, the relation between the actions of viscosity and glossiness and the resist components is complicated and unclear, but the glossiness and the viscosity can be controlled in the following manner.

With regard to the glossiness, it is possible to provide a high glossiness by increasing a molecular weight of a binder resin and its addition amount.

With regard to the viscosity and the $\eta 5/\eta 50$ ratio, it is possible to control them by controlling a molecular weight of a binder resin and its addition amount. It is known that a solution viscosity becomes high in proportion to an increase in the molecular weight of a binder resin, but in the pigment dispersion system, the binder resin has a function of preventing pigments themselves from being aggregated and the preventing effect becomes stronger in proportion to an increase in the molecular weight. Thus, in the dispersion system, there exists an optimum molecular weight of a binder resin to satisfactory viscosity and $\eta 5/\eta 50$ viscosity ratio, and accordingly the viscosity can be controlled by optimizing the molecular weight. Also, when the addition amount of a binder resin becomes large, a viscosity is increased due to the resin itself, and on the contrary, when the addition amount of a binder resin becomes small, a viscosity is increased due to the aggregation of pigments. Accordingly, it is possible to obtain a pigment dispersion and a resist composition having a more satisfactory viscosity property by using such an addition amount as to provide a minimum viscosity and $\eta 5/\eta 50$ viscosity ratio.

Also, it is not clear why glossiness and/or viscosity property have a large influence on a photosensitive property of a resist, but the control of these factors becomes important for providing a satisfactory photosensitive property since in such a system containing a large amount of fine pigment particles as a color resist, the interaction among fine particles is very strong. It is considered that the above-mentioned physical property value range, the interaction among fine particles achieves a favorable action on a resist property. When the viscosity at 25° C. is lower than the range of from 2 to 20 mps, it is difficult to secure a coating thickness necessary for a color filter and a contrast is lowered due to the shortage of light-shielding property and defects including pinholes tend to occur. On the other hand, if the viscosity exceeds the above-mentioned range, coating non-uniformity, resolution non-uniformity and developing non-uniformity are remarkably caused.

Further, if the ratio η5/η50 of viscosities measured respectively at 5 rpm and at 50 rpm revolutions is deviated from the range of 1 to 1.5, a resolution, a developing property and an adhesiveness tend to be degraded, and consequently a quality and a productivity of a color filter are largely lowered.

Another preferable embodiment for achieving the aimed specific glossiness of the present invention is to provide a black resist composition containing a dispersion resin (a pigment dispersant) which is a polyester and/or polyether and having a basic functional group, as a high molecular dispersant. Examples of the basic functional group include a primary, secondary or tertiary amino group or a functional group having an N-containing heterocyclic ring such as pyridine, pyrimidine or pyrazine. The polyester or polyether mentioned above means a high molecular compound having

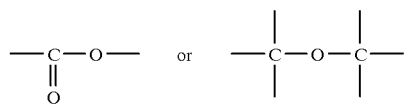

structure as a part of the compound, and also include polyester polyol having both of the above structures as a part of the compound.

The basic functional group has an amine value in the range of from 1 to 100 mgKOH/g, preferably from 2 to 90 mgKOH/g. When the amine value is less than the above-mentioned range, a dispersion stability is lowered, and on the contrary, when the amine value exceeds the above-mentioned range, a developing property and a resolution tend to be degraded. The amine value is a value expressed by mg number of KOH corresponding to an acid value required to neutralize a basic amino group with an acid by titration. Also, it is preferable that the above functional group is present at the terminal of a resin. A molecular weight is preferably a weight average molecular weight of from 1,000 to 100,000 in terms of polystyrene conversion. If the molecular weight is less than 1,000, a dispersion stability is lowered, and on the contrary, if the molecular weight exceeds 100,000, a developing property and a resolution tend to be degraded.

Examples of a high molecular dispersant satisfying these conditions include commercially available products such as Disperbyk 160, Disperbyk 161, Disperbyk 162, Disperbyk 163, Disperbyk 164 and Disperbyk 166 (tradenames, manufactured by Bick Chemie Company) and SOLSPERSE 20000, SOLSPERSE 24000, SOLSPERSE 27000 and SOLSPERSE 28000 (tradenames, manufactured by Zeneca Company).

Still other embodiment for achieving the aimed specific glossiness of the present invention is to provide a black resist composition containing a dispersion resin obtained by reacting at least (i) a polyisocyanate compound, (ii) a compound having at least one hydroxyl group in a molecule and (iii) a compound having active hydrogen and a tertiary amino group in the same molecule.

Examples of the polyisocyanate compound (i) include aromatic diisocyanates such as paraphenylene diisocyanate, 2,4-tolylene diisocyanate, 2,6-tolylene diisocyanate, 4,4'-diphenylmethane diisocyanate, naphthalene-1,5-diisocyanate, tolidine diisocyanate and the like; aliphatic diisocyanates such as hexamethylene diisocyanate, lysine methyl ester diisocyanate, 2,4,4-trimethylhexamethylenediisocyanate, dimer acid diisocyanate and the like; cycloaliphatic diisocyanates such as isophorondiisocyanate, 4,4'-methylenebis (cyclohexylisocyanate), ω,ω'-diisocyanate dimethylcyclohexane and the like; aliphatic diisocyanates having aromatic rings such as xylylenediisocyanate, α,α,α',α'-tetramethylxylylenediisocyanate and the like; triisocyanates such as lysine ester triisocyanate, 1,6,11-undecanetriisocyante, 1,8-diisocyanate-4-isocyanatemethyloctane, 1,3,6-hexamethylenetriisocyanate, bicycloheptanetriisocyanate, tris(isocyanate phenylmethane), tris(isocyanate phenyl)thiophosphate and the like; and their trimers, water adducts, and their polyol adducts, and the like. A preferable example of the polyisocyanate include a trimer of an organic diisocyanate, and more preferable examples include a trimer of tolylenediisocyanate and a trimer of isophorondiisocyanate, and these may be used respectively alone or in combination.

An example of a method for preparing an isocyanate trimer includes a method for preparing an aimed isocyanurate group-containing polyisocyanate, which comprises partly trimerizing isocyanate groups of the above polyisocyanates in the presence of an appropriate trimerization catalyst such as tertiary amines, phosphines, alkoxides, metal oxides or carboxylates, terminating the trimerization by adding a catalytic poison and removing unreacted polyisocyanate by solvent extraction or thin film distillation.

In the compound (ii) having at least one hydroxyl group in the same molecule, the number of a hydroxyl group is not specially limited, but a compound having 1 or 2 hydroxyl groups in the same molecule is preferable, and its number average molecular weight is preferably from 300 to 10,000.

Examples of the compound having one or two hydroxyl groups in the same molecule include polyether glycol, polyester glycol, polycarbonate glycol, polyolefin glycol, and their compounds having a hydroxyl group alkoxylated with a $C_1$–$C_{25}$ alkyl group at one terminal and a mixture of two or more.

Examples of the polyether glycol include polyether diol, polyether ester diol and their mixture of two or more. Examples of the polyether diol include homopolymerized or copolymerized products of an alkylene oxide such as polyethylene glycol, polypropylene glycol, polyethylenepropylene glycol, polyoxytetramethylene glycol, polyoxyhexamethylene glycol, polyoxyoctamethylene glycol and a mixture of two or more. Examples of the polyether ester diol include a reaction product of an ether group-containing diol or its mixture with other glycol and a dicarboxylic acid or its anhydride, or a reaction product of a polyester glycol and an alkylene oxide, such as poly(polyoxytetramethyl)adipate, and the like. Most preferable examples of the polyether glycol include polyethylene glycol, polypropylene glycol, polyoxytetramethylene glycol or their compounds having a hydroxyl group alkoxylated with a $C_1$–$C_{25}$ alkyl group at one terminal.

Examples of the polyester glycol include a polycondensation product of a dicarboxylic acid (such as succinic acid, glutaric acid, adipic acid, sebacic acid, fumaric acid, maleic acid, phthalic acid or the like) or its anhydride with glycol (such as an aliphatic glycol including ethylene glycol, diethylene glycol, triethylene glycol, propylene glycol, dipropylene glycol, tripropylene glycol, 1,2-butanediol, 1,3-butandione, 1,4-butanediol, 2,3-butandiol, 3-methyl-1,5-pentanediol, neopentyl glycol, 2-methyl-1,3-propanediol, 2-methyl-2-propyl-1,3-propanediol, 2-butyl-2-ethyl-1,3-propanediol, 1,5-pentanediol, 1,6-hexanediol, 2-methyl-2,4-pentanediol, 2,2,4-trimethyl-1,3-pentanediol, 2-ethyl-1,3-hexanediol, 2,5-dimethyl-2,5-hexanediol, 1,8- octamethylene glycol, 2-methyl-1,8-octamethylene glycol, 1,9-nonanediol or the like, a cycloaliphatic glycol including bishydroxymethylcyclohexane or the like, an aromatic glycol including xylylene glycol, bishydroxyethoxybenzene or the like, and an N-alkyldialkanol amine including N-methyldiethanol amine or the like), e.g. polyethylene adipate, polybutylene adipate, polyhexamethylene adipate, polyethylene/propylene adipate or the like, polylactone diol or polylactone monool obtained by using the above diols or a $C_1$–$C_{25}$ monohydric alcohol as an initiator, e.g. polycaprolactone glycol, polymethylvalerolactone and their mixture of two or more. Most preferable examples of the polyester glycol include polycaprolactone glycol or polycaprolactone obtained by using a $C_1$–$C_{25}$ alcohol as an initiator, more particularly a compound obtained by ring opening addition polymerization of ε-caprolactone with monool.

Examples of the polycarbonate glycol include poly(1,6-hexylene)carbonate, poly(3-methyl-1,5-pentylene) carbonate and the like.

Examples of the polyolefin glycol include polybutadiene glycol, hydrogenated polybutadiene glycol, hydrogenated polyisoprene glycol and the like.

Among compounds having 1 or 2 hydroxyl groups in the same molecule, polyether glycol and/or polyester glycol are particularly preferable.

The compounds having 1 or 2 hydroxyl groups in the same molecule have a number average molecular weight of from 300 to 10,000, preferably from 500 to 6,000, more preferably from 1,000 to 4,000.

The compound (iii) having active hydrogen and a tertiary amino group in the same molecule is explained hereinafter. Examples of the active hydrogen, i.e. a hydrogen atom directly bonded to an oxygen atom, a nitrogen atom or a sulfur atom, include a hydrogen atom in a functional group such as a hydroxyl group, an amino group, a thiol group or the like, and among them, a hydrogen atom in an amino group, particularly a primary amino group, is preferable.

The tertiary amino group is not specially limited, but examples of the tertiary amino group include an amino group having a $C_1$–$C_4$ alkyl group or a group having a heterocyclic structure such as an imidazole ring or a triazole ring.

Examples of the compound having active hydrogen and a tertiary amino group in the same molecule include N,N-dimethyl-1,3-propane diamine, N,N-diethyl-1,3-propane diamine, N,N-dipropyl-1,3-propane diamine, N,N-dibutyl-1,3-propane diamine, N,N-dimethylethylene diamine, N,N-diethylethylene diamine, N,N-dipropylethylene diamine, N,N-dibutylethylene diamine, N,N-dimethyl-1,4-butane diamine, N,N-diethyl-1,4-butane diamine, N,N-dipropyl-1,4-butane diamine, N,N-dibutyl-1,4-butane diamine and the like.

Also, examples of the tertiary amino group having an N-containing heterocyclic ring, include an N-containing 5-membered heterocyclic ring such as a pyrazole ring, an imidazole ring, a triazole ring, a tetrazole ring, an indole ring, a carbazole ring, an indazole ring, a benzimidazole ring, a benzotriazole ring, a benzooxazole ring, a benzothiazole ring or a benzothiadiazole ring, and an N-containing 6-membered heterocyclic ring such as a pyridine ring, a pyridazine ring, a pyrimidine ring, a triazine ring, a quinoline ring, an acridine ring or an isoquinoline ring. Preferable examples of these N-containing heterocyclic rings include an imidazole ring or a triazole ring.

Examples of compounds having these imidazole rings and $NH_2$ groups include 1-(3-aminopropyl)imidazole, histidine, 2-aminoimidazole, 1-(2-aminoethyl)imidazole and the like.

Also, examples of compounds having triazole rings and $NH_2$ groups include 3-amino-1,2,4-triazole, 5-(2-amino-5-chlorophenyl)-3-phenyl-1H-1,2,4-triazole, 4-amino-4H-1,2,4-triazole-3,5-diol, 3-amino-5-phenyl-1H-1,3,4-triazole, 5-amino-1,4-diphenyl-1,2,3-triazole, 3-amno-1-benzyl-1H-2,4-trizole and the like.

Among them, N,N-dimethyl-1,3-propane diamine, N,N-diethyl-1,3-propane diamine, 1-(3-aminopropyl) imidazole and 3-amino-1,2,4-traizole are preferable.

A preferable blending ratio of these dispersion resin starting materials is 100 parts by weight of (i) polyisocyanate compound, from 10 to 200 parts by weight, preferably from 20 to 190 parts by weight, more preferably from 30 to 180 parts by weight of (ii) compound having at least one hydroxyl group in the same molecule, and from 0.2 to 25 parts by weight, preferably from 0.3 to 24 parts by weight of (iii) compound having active hydrogen and a tertiary amino group in the same molecule.

The dispersion resin has a weight average molecular weight of from 1,000 to 200,000, preferably from 2,000 to 100,000, more preferably 3,000 to 50,000 in terms of polystyrene conversion. If the molecular weight is less than 1,000, a dispersibility and a dispersion stability become poor, and if the molecular weight exceeds 200,000, a solubility is lowered and a dispersibility is also lowered and the reaction is hardly controlled.

The production of the dispersion resin is carried out in accordance with a well known method of polyurethane resin production. Examples of a solvent used in the production include ketones such as acetone, methyl ethyl ketone, methyl isobutyl ketone, cyclopentanone, cyclohexanone, isophorone and the like, esters such as ethyl acetate, butyl acetate, acetic acid cellosolve and the like, hydrocarbons such as benzene, toluene, xylene, hexane and the like, a part of alcohols such as diacetone alcohol, isopropanol, secondary butanol, tertiary butanol and the like, chlorides such as methylene chloride, chloroform and the like, ethers such as tetrahydrofuran, diethylether and the like, and aprotic polar solvents such as dimethylformamide, N-methylpyrrolidone, dimethylsulfoxide and the like.

Examples of a catalyst used in the production include a catalyst used for urethane formation reaction, e.g. a tin type catalyst such as dibutyltin dilaurate, dioctyltin dilaurate, dibutyltin dioctoate, stannous octoate or the like, an iron type catalyst such as iron acetylacetonate, ferric chloride or the like, and a tertiary amine type catalyst such as triethyl amine, triethylene diamine or the like.

The above-mentioned dispersion resin obtained by reacting at least (i) a polyisocyanate compound, (ii) a compound having at least one hydroxyl group in a molecule and (iii) a compound having active hydrogen and a tertiary amino group in the same molecule, may preferably have an ethylenic unsaturated group in a side chain. The dispersion resin having such a side chain can be prepared by using a compound obtained by dehydration reaction of a hydroxyl group at one terminal of the above-mentioned compound (ii) having at least one hydroxyl group in the same molecule with (iv) a compound having active hydrogen and an ethylenic unsaturated group in the same molecule.

The compound (iv) having active hydrogen and an ethylenic unsaturated group in the same molecule is explained hereinafter. Examples of the active hydrogen, i.e. a hydrogen atom directly bonded to an oxygen atom, a nitrogen atom or a sulfur atom, include hydrogen atoms in a functional group such as a hydroxyl group, a carboxyl group, an amino group, a thiol group or the like, and among them, a hydrogen atom in a hydroxyl group is preferable. Examples of the hydroxyl group include alcohol, phenol and oxime, and examples of the thiol group include mercaptan and thiophenol.

More particular example of the ethylenic unsaturated group includes a (meth)acryl group.

Examples of the compound having active hydrogen and an ethylenic unsaturated group in the same molecule include a compound having one active hydrogen and one ethylenic unsaturated group such as 2-hydroxyethyl(meth)acrylate, 2-hydroxypropyl(meth)acrylate, 2-hydroxybutylmethacrylate, 2-hydroxy-3-chloropropyl (meth)acrylate, 2-hydroxy-3-phenoxypropylacrylate, 4-hydroxybutylacrylate, cyclohexanedimethanol mono (meth)acrylate, polytetramethylene ether glycol mono (meth)acrylate, allyl alcohol, ethyleneglycol monoallyl ether or ethylene glycol monovinyl ether, a compound having one active hydrogen and at least two ethylenic unsaturated groups such as pentaerythritol triacrylate or glycerol dimethacrylate, and a compound having two active hydrogen and one ethylenic unsaturated group such as glycerin mono(meth)acrylate, glycerin monoallyl ether or trimethylol propane mono(meth)acrylate. Also, the active hydrogen may be in such a carboxyl group as in (meth)acrylic acid, 2-(meth)acryloyloxyethylsuccinic acid, 2-methacryloyloxyethylhexahydrophthalic acid or 2-acryloyloxyethylphthalic acid.

Examples of the above-mentioned compound (ii) having at least one hydroxyl group in the same molecule and having one hydroxyl group at one terminal subjected to dehydration reaction with a compound (iv) having active hydrogen and an ethylenic unsaturated group in the same molecule, include polycaprolactone glycol and the like obtained by using a hydroxyalkyl (meth)acrylate such as hydroxyethyl acrylate as an initiator.

Also, the above-mentioned dispersion resin having an ethylenic unsaturated group in a side chain can be obtained simply by reacting the above-mentioned compounds (i), (ii), (iii) and (iv) used as resin starting materials.

A preferable blending ratio of starting materials for the dispersion resin having an ethylenic unsaturated group in a side chain, is 100 parts by weight of (i) a polyisocyanate compound, from 10 to 200 parts by weight, preferably from 20 to 190 parts by weight, more preferably from 30 to 180 parts by weight of (ii) a compound having at least one hydroxyl group in the same molecule, from 0.2 to 25 parts by weight, preferably from 0.3 to 24 parts by weight of (iii) a compound having active hydrogen and a tertiary amino group in the same molecule, and from 0.5 to 30 parts by weight, preferably from 1 to 20 parts by weight of (iv) a compound having active hydrogen and an ethylenic unsaturated group in the same molecule.

An ethylenic unsaturated group is introduced into a dispersion resin in an equivalent amount of from 0.01 to 3 meq/g, preferably from 0.1 to 2.5 meq/g, more preferably from 0.2 to 2 meq/g. When the introduced amount of the ethylenic unsaturated group is within the above-mentioned range, a curability and a dispersibility are satisfactory.

In the dispersion resin obtained by reacting at least the above-mentioned (i) polyisocyanate compound, (ii) compound having at least one hydroxyl group in a molecule and (iii) compound having active hydrogen and a tertiary amino group in the same molecule, the introduced amount of the compound (iii) having active hydrogen and a tertiary amino group in the same molecule is controlled in such an amount as to provide a dispersion resin having an amine value in the range of from 1 to 100 mgKOH/g, preferably from 5 to 95 mgKOH/g, after reaction. If the amine value is lower than the above-mentioned range, a dispersion performance tends to be degraded, and on the contrary, the amine value exceeds the above-mentioned range, a developing property tends to be lowered.

Further, when an isocyanate group remains in the dispersion resin in the above reaction, it is preferable to react the remaining isocyanate group with an alcohol or an amino compound, so that the stability as a lapse time of the dispersion resin can be improved.

In order to provide a satisfactory stability (no change in an image-forming performance after storing a resist composition), it is preferable for the black resist composition of the present invention to contain the above-mentioned high molecular dispersant, and a blending ratio in such a case is 100 parts by weight of a photosensitive resin material, from 20 to 470 parts by weight of a black pigment, from 0.005 to 47 parts by weight of a high molecular dispersant and from 90 to 9,500 parts by weight of a solvent. A more particular blending ratio is 100 parts by weight of a binder resin, from 5 to 100 parts by weight, preferably from 10 to 95 parts by weight, more preferably from 15 to 90 parts by weight of a monomer, from 0.01 to 30 parts by weight, preferably from 0.05 to 28 parts by weight, more preferably from 0.1 to 25 parts by weight of a photo-polymerization initiator, from 50 to 500 parts by weight, preferably from 60 to 490 parts by weight, more preferably from 70 to 480 parts by weight of a pigment, from 0.01 to 50 parts by weight, preferably from 0.05 to 49 parts by weight, more preferably from 0.1 to 48 parts by weight of a dispersion resin, and from 200 to 10,000 parts by weight, preferably from 250 to 9,500 parts by weight, more preferably from 300 to 9,000 parts by weight of a solvent.

By using the dispersant of the present invention, it is possible to prepare a black resist composition having a satisfactory dispersibility, and when a black matrix is produced by using such a black resist composition, a black matrix having a high resolution, a high adhesiveness, a satisfactory storage stability and a high light-shielding property can be produced without causing coating non-uniformity although carbon black is contained at a high concentration.

The black resist composition of the present invention may be coated on a transparent substrate by a conventional means such as a spin coater, a roll coater, a curtain coater or a screen printing. Examples of the transparent substrate include glass, plastics such as PET, acrylic resin and polycarbonate, and the like. The coating film thickness is preferably from 0.2 $\mu$m to 10 $\mu$m, more preferably from 0.3 to 5 $\mu$m. To dry the coating film, a convection oven or a hot plate is used. The drying temperature is from 50° C. to 150° C., and the drying time is preferably from 30 seconds to 60 minutes. For exposure, a high pressure mercury lamp, an ultra-high pressure mercury lamp, a xenon lamp, a carbon arc or the like, which emits UV ray, can be usually employed, and by exposure through a mask, a latent image will be formed on a resist film. By development with a solvent capable of dissolving a non-exposed portion, an image will be formed. As the developer, an organic solvent such as acetone, toluene or methyl ethyl ketone may be used. However, an alkali developing solution is preferred in view of an environmental problem. For example, an aqueous sodium hydroxide solution, an aqueous potassium hydroxide solution, an aqueous sodium carbonate solution, an aqueous potassium carbonate solution, aqueous ammonia, or an aqueous tetramethylammonium hydroxide solution may be employed. The alkali developing solution may further contain a surfactant, an anti-foam agent, and the like. The development method is not particularly limited, and development can be carried out by a conventional method such as a paddling method, a dipping method or a spraying method. Further, prewetting may be employed. For the purpose of drying the developing solution after forming an image or increasing the curing of a resist film, post baking or post photocuring may, for example, be employed.

The black resist composition for a color filter of the present invention is excellent in developing property, resolution, adhesiveness and stability. Particularly, when a specific dispersion resin is used, many pigments can be efficiently dispersed and a black matrix having a satisfactory light-shielding property and a high accuracy can be stably produced. Thus, a color filter for a liquid crystal display having a high quality can be provided at a low cost.

EXAMPLES

Now, the present invention will be described in detail with reference to Examples. However, the present invention is by no means restricted by the following Examples unless it does not exceed the gist of the present invention.

Preparation of Dispersion Resin

Preparation Example-1

32 g of tolylene diisocyanate trimer (Mitech GP 750A manufactured by Mitsubishi Chemical Corporation, resin solid content 50 wt %, butyl acetate solution) and 0.02 g of dibutyltin dilaurate as a catalyst were diluted with 47 g of PGMEA (propylene glycol monomethylether acetate). Under stirring, 14.4 g of polyethylene glycol of a number average molecular weight of 1,000 having a methoxy group at one terminal (Uniox M-1000 manufactured by Nihon Yushi K.K.) and 9.6 g of polypropylene glycol having a number average molecular weight of 1,000 (Sunnix PP-1000 manufactured by Sanyo Kasei Kogyo K.K.) were dropwise added to the above mixture, and the resultant mixture was reacted at 70° C. for 3 hours. Thereafter, 1 g of N,N-dimethylamino-1,3-propane diamine was added therein, and the resultant mixture was further reacted at 40° C. for 1 hour.

A solution containing the dispersion resin thus obtained was measured with respect to its amine value by neutralization titration, and the amine value was 14 mgKOH/g. Also, its resin content was measured by dry-up method (resin concentration calculated from an amount of weight change caused by removing a solvent on a hot plate at 150° C. for 30 minutes), and the resin content was 40 wt %. A weight average molecular weight of the dispersion resin was 8,500.

Preparation of Binder Resin

Preparation Example-2

20 g of styrene/acrylic acid resin having an acid value of 200 and a weight average molecular weight of 5,000, 0.2 g of p-methoxyphenol, 0.2 g of dodecyltrimethylammonium chloride and 40 g of propylene glycol monomethyl ether aetate, were charged into a flask, and 7.6 g of (3,4-epoxycyclohexyl)methyl acrylate was dropwise added thereto, and the mixture was reacted at a temperature of 100° C. for 30 hours. The reaction solution was re-precipitated in water and dried to obtain a resin. Neutralization titration was carried out with KOH, whereby the acid value of the resin was 80. A weight average molecular weight of the resin was 8,000.

Examples 1 to 4 and Comparative Examples 1 to 2
Preparation of Carbon Black Dispersion 50 parts by weight (solid content conversion) of carbon black MA-220 (specific surface area 31 m$^2$/g, pH 3.0, manufactured by Mitsubishi Chemical Corporation) and 5 parts by weight (solid content conversion) of each dispersion resin shown in Table 1 were mixed with PGMEA so as to prepare a dispersion having a solid content concentration of 50 wt %. The weight of the dispersion was 50 g. This dispersion was fully stirred by a stirrer and was subjected to premixing.

Thereafter, the dispersion was subjected to dispersion treatment by a paint shaker at 25–45° C. as described in Table 1. Beads employed were zirconia beads of 0.5 mmφ used in the same amount as that of the dispersion.

After finishing dispersion, the beads and the dispersion were separated by a filter.

Preparation of Black Resist Composition

The above prepared carbon black dispersion and the following components were mixed so as to provide the following mixing ratio of solid components, and the resultant mixture was stirred by a stirrer and dissolved.

(1) Composition of Resist

| | | |
|---|---|---|
| a) | Binder resin (prepared in Preparation Example-2) | 25 g |
| b) | Acrylic monomer: dipentaerythritol hexaacrylate | 15 g |
| c) | Initiator (combination of 3 kinds) | |
| | c-1: 2-(2-chlorophenyl)-4,5-diphenylimidazole dimer | 2 g |
| | c-2: 4,4'-bis(diethylamino)benzophenone | 1.0 g |
| | c-3: 2-mercaptobenzothiazole | 1 g |
| d) | Pigment Carbon black MA-220 (Specific surface area 31 m$^2$/g, pH = 3.0) | 50 g |
| e) | High molecular dispersants shown in Table 1 The dispersant in Comparative Example 1 has a weight average molecular weight of 10,000 and an acid value of 100. The dispersant in Comparative Example 2 has a weight average molecular weight of 4,800 and an acid value of 70. | 5 g |
| f) | Solvent Propylene glycol monomethylether acetate | 300 g |

(2) Evaluation of Resist

A viscosity of the above prepared black resist composition was measured at a constant temperature of 25° C. by an E type rotary viscometer (manufactured by Tokyo Seimitsu K.K.) respectively under conditions of 5 rpm and 50 rpm revolutions. Thereafter, the black resist composition was coated on a glass substrate (7059, manufactured by Corning Company) by a spin coater, and was dried at 80° C. on a hot plate for one minute. After drying, a coating thickness of the resist was measured by a profilometer (α-step, manufactured by Tencol Company) and was 1μ. After drying, a 20° specular glossiness of the resist film was measured by a gloss meter (manufactured by Bick Chemie Company). Also, coating non-uniformity was visually observed and evaluated. As this result, a uniform coating was expressed by ○ (good), and a non-uniform coating was expressed by X (bad). Further, an optical density (OD) was measured by a Macbeth reflection densitometer TR 927 (manufactured by Cormorgun Company).

Thereafter, this sample was exposed to light through a mask under a high pressure mercury lamp at 2,000 mj/cm$^2$ to form an image. The light-exposed sample was developed at a temperature of 25° C. for various times by being dipped in an aqueous potassium hydroxide solution having a concentration of 0.05% to develop a resist pattern. The resist pattern thus developed was observed by a microscope of 200 times magnification to check a resolution. A resolution of not more than 10μ was expressed by ○ (good), and a resolution of exceeding 10μ was expressed by X (bad). A development latitude was evaluated by a development time interval to form a resist pattern of 20±1μ corresponding to a mask size of 20μ. Further, an adhesiveness was evaluated by adhesive cellophane tape test (an adhesive cellophane tape is applied to a resist pattern and is peeled off the pattern), and when the resist pattern was not peeled, it was evaluated as good (○) and when the resist pattern was peeled, it was evaluated as bad (X).

The results are shown in the following Table 1.

TABLE 1

|  | Dispersant | Dispersion time | η5 | η50 | η5/η50 | 20° specular glossiness of resist film | Coating non-uniformity | Resolution | Adhesiveness | Development latitude | OD |
|---|---|---|---|---|---|---|---|---|---|---|---|
| Example 1 | Preparation Example-1 | 6 | 4.9 | 4.1 | 1.19 | 138 | ○ | ○ (8μ) | ○ | 15 S | 3.5 |
| Example 2 | Preparation Example-1 | 8 | 5.1 | 4.3 | 1.18 | 148 | ○ | ○ (8μ) | ○ | 10 S | 3.5 |
| Example 3 | Preparation Example-2 | 6 | 7.2 | 6.1 | 1.18 | 104 | ○ | ○ (8μ) | ○ | 5 S | 3.5 |
| Example 4 | Preparation Example-2 | 8 | 8.4 | 6.8 | 1.23 | 117 | ○ | ○ (8μ) | ○ | 5 S | 3.5 |
| Comparative Example 1 | methacrylic acid/methyl methacrylate resin *1 | 12 | 28.8 | 15.6 | 1.84 | 40 | x | x (50μ) | x | 0 S | 2.2 |
| Comparative Example 2 | novolak epoxy acrylate *2 | 10 | 15.2 | 10 | 1.52 | 80 | x | x (50μ) | x | 0 S | 2.7 |

*1: Weight average molecular weight: 10,000 Acid value: 100
*2: Weight average molecular weight: 4,800 Acid value: 70

Preparation of Dispersion Resin

Preparation Examples-3 to 12

Dispersion resins were prepared in the same manner as in PREPARATION EXAMPLE-1, except that compounds shown in Table 2 were used.

TABLE 2

Dispersion resin

|  |  | Preparation Example-1 | Preparation Example-3 | Preparation Example-4 | Preparation Example-5 | Preparation Example-6 | Preparation Example-7 | Preparation Example-8 | Preparation Example-9 | Preparation Example-10 | Preparation Example-11 | Preparation Example-12 |
|---|---|---|---|---|---|---|---|---|---|---|---|---|
| TDI Trimer (50% PGMEA) | (g) | 32 | 32 | 32 |  | 32 | 32 | 32 | 32 | 32 | 32 | 32 |
| IPDI Trimer (70% PGMEA) | (g) |  |  |  | 22.9 |  |  |  |  |  |  |  |
| PPG1000 | (g) | 9.6 | 9.6 | 9.6 | 9.6 |  |  | 9.6 |  | 9.6 | 9.6 | 9.6 |
| PEG1000 | (g) |  |  |  |  | 9.6 |  |  |  |  |  |  |
| PEG1000 (OCH₃) | (g) | 14.4 | 14.4 | 14.4 | 14.4 | 14.4 | 14.4 |  |  |  | 14.4 | 14.4 |
| PEG2000 (OCH₃) | (g) |  |  |  |  |  |  |  |  |  | 14.4 |  |
| PTMG1000 | (g) |  |  |  |  |  |  | 9.6 | 9.6 |  |  |  |
| PCL (OC₁₂H₂₅) | (g) |  |  |  |  |  |  | 14.4 | 14.4 |  |  |  |
| N,N-dimethylamino-1,3-propane diamine | (g) | 1 | 0.5 | 2 | 1 | 1 | 1 | 1 | 1 | 1 |  |  |
| 3-amino-1,2,4-triazole | (g) |  |  |  |  |  |  |  |  |  | 0.8 |  |
| 1-(3-aminopropyl)-imidazole | (g) |  |  |  |  |  |  |  |  |  |  | 1.25 |
| Dibutyltin dioctoate | (g) | 0.02 | 0.02 | 0.02 | 0.02 | 0.02 | 0.02 | 0.02 | 0.02 | 0.02 | 0.02 | 0.02 |
| PGMEA | (g) | 47 | 47 | 47 | 47 | 47 | 47 | 47 | 47 | 47 | 47 | 47 |

TABLE 2-continued

Dispersion resin

|  | Preparation Example-1 | Preparation Example-3 | Preparation Example-4 | Preparation Example-5 | Preparation Example-6 | Preparation Example-7 | Preparation Example-8 | Preparation Example-9 | Preparation Example-10 | Preparation Example-11 | Preparation Example-12 |
|---|---|---|---|---|---|---|---|---|---|---|---|
| Amine value | 14 | 7 | 28 | 14 | 14 | 14 | 14 | 14 | 14 | 14 | 14 |
| Weight average molecular weight | 8500 | 9900 | 8400 | 7500 | 12100 | 11400 | 9900 | 10800 | 9600 | 9100 | 6300 |

TDI: tolylene diisocyanate
IPDI: isophorone diisocyanate
PPG1000: polypropylene glycol (Mn: 1000)
PEG1000: polyethylene glycol (Mn: 1000)
PEG1000 ($OCH_3$): polyethylene glycol having $OCH_3$ at one terminal (Mn: 1000)
PEG2000 ($OCH_3$): polyethylene glycol having $OCH_3$ at one terminal (Mn: 2000)
PTMG: polyoxytetramethylene glycol (Mn: 1000)
PCL ($OC_{12}H_{25}$): polycaprolactone having $OC_{12}H_{25}$ at one terminal
PGMEA: propylene glycol monomethyl ether acetate Examples 5 to 19 and Comparative Example 3
Preparation of Carbon Black Dispersion 50 parts by weight of each carbon black and 5 parts by weight (solid content conversion) of each dispersion resin shown in Table 3 were mixed with PGMEA so as to prepare a dispersion having a solid content concentration of 50 wt %. The weight of the dispersion was 50 g. This dispersion was fully stirred by a stirrer and was subjected to premixing.

Thereafter, the dispersion was subjected to dispersion treatment by a paint shaker at 25–45° C. for 8 hours. Beads employed were zirconia beads of 0.5 mmφ used in the same weight amount as that of the dispersion.

After finishing dispersion, the beads and the dispersion were separated by a filter.

The carbon blacks used had the following specific surface areas and pH values.

|  | Specific surface area ($m^2/g$) | pH |
|---|---|---|
| Asahi Thermal | 24 | 8.8 |
| MA-220 | 31 | 3.0 |
| SP 250 | 40 | 3.1 |
| SP 350 | 65 | 3.5 |
| MA-11 | 104 | 3.5 |

Gloss Measurement of Carbon Black Dispersion

In order to evaluate the dispersed state of the above dispersion, a glossiness was measured in the following manner. When the dispersed state is satisfactory, the particle size of carbon black is small, and consequently diffused reflection is restrained, thereby producing a high glossiness. Thus, a dispersion having a higher glossiness provides a more satisfactorily dispersed state.

A dispersion was coated on a glass substrate by a spin coater, and was dried on a hot plate at 80° C. for 1 minute. This sample was measured with respect to a 20° specular glossiness by a gloss meter (manufactured by Bick Chemie Company). The results are shown as "Glossiness-1" in Table 3.

Preparation of Black Resist Composition

The above prepared carbon black dispersion and the following components were mixed so as to provide the following mixing ratio of solid components, and the resultant mixture was stirred by a stirrer and dissolved.

(1) Composition of Resist

| a) | Binder resin (prepared in Preparation Example-2) | 25 g |
|---|---|---|
| b) | Acrylic monomer: dipentaerythritol hexaacrylate | 15 g |
| c) | Initiator (combination of 3 kinds) |  |
|  | c-1: 2-(2-chlorophenyl)-4,5-diphenylimidazole dimer | 2 g |
|  | c-2: 4,4'-bis(diethylamino)benzophenone | 1.0 g |
|  | c-3: 2-mercaptobenzothiazole | 1 g |
| d) | Pigment Carbon black shown in Table 3 | 50 g |
| e) | High molecular dispersants shown in Table 3 | 5 g |
| f) | Solvent Propylene glycol monomethylether acetate | 300 g |

(2) Evaluation of Resist

The above prepared black resist composition was coated on a glass substrate (7059, manufactured by Corning Company) by a spin coater, and was dried at 80° C. on a hot plate for one minute. After drying, a coating thickness of the resist was measured by a profilometer (α-step, manufactured by Tencol Company) and was 1μ. After drying, a 20° glossiness of the resist film ("Glossiness-2") was measured by a gloss meter (manufactured by Bick Chemie Company). Also, coating non-uniformity was visually observed and evaluated. As this result, a uniform coating was expressed by ○ (good), and a non-uniform coating was expressed by X (bad). Further, an optical density (OD) was measured by a Macbeth reflection densitometer TR 927 (manufactured by Cormorgun Company).

Thereafter, this sample was exposed to light through a mask under a high pressure mercury lamp at 2,000 mj/$cm^2$ to form an image. The light-exposed sample was developed at a temperature of 25° C. for 1 minute by being dipped in an aqueous potassium hydroxide solution having a concentration of 0.05% to develop a resist pattern. The resist pattern thus developed was observed by a microscope of 200 times magnification to check a resolution. A resolution of not more than 10μ was expressed by ○ (good), and a resolution of exceeding 10 μ was expressed by X (bad). Also, an adhesiveness was evaluated by adhesive cellophane tape test (an adhesive cellophane tape is applied to a resist pattern and is peeled off the pattern), and when the resist pattern was not peeled, it was evaluated as good (○) and when the resist pattern was peeled, it was evaluated as bad (X).

Further, the black resist composition was allowed to stand at room temperature for one day, and the image formation was carried out in the same manner as above. The stability of the composition of forming a resist pattern of not more than 10μ was evaluated as good (○) and the stability of the composition of not forming such a resist pattern was evaluated as bad (X).

The evaluation results are shown in the following Table 3.

ization titration, and the amine value was 28 mgKOH/g. Also, its resin content was measured by dry-up method (resin concentration calculated from an amount of weight change caused by removing a solvent on a hot plate at 150° C. for 30 minutes), and the resin content was 40 wt %.

TABLE 3

|  | Dispersant | Carbon black | Glossiness-1 *1 | Coating non-uniformity | Resolution | Adhesiveness | Stability | OD | Glossiness-2 *2 |
|---|---|---|---|---|---|---|---|---|---|
| Example 5 | Preparation Example-1 | MA-220 | 125 | ○ | ○ (8μ) | ○ | ○ | 3.5 | 115 |
| Example 6 | Preparation Example-3 | MA-220 | 118 | ○ | ○ (8μ) | ○ | ○ | 3.5 | 108 |
| Example 7 | Preparation Example-4 | MA-220 | 147 | ○ | ○ (8μ) | ○ | ○ | 3.5 | 137 |
| Example 8 | Preparation Example-5 | MA-220 | 142 | ○ | ○ (8μ) | ○ | ○ | 3.5 | 132 |
| Example 9 | Preparation Example-6 | MA-220 | 142 | ○ | ○ (8μ) | ○ | ○ | 3.5 | 132 |
| Example 10 | Preparation Example-7 | MA-220 | 130 | ○ | ○ (8μ) | ○ | ○ | 3.5 | 120 |
| Example 11 | Preparation Example-8 | MA-220 | 138 | ○ | ○ (8μ) | ○ | ○ | 3.5 | 128 |
| Example 12 | Preparation Example-9 | MA-220 | 152 | ○ | ○ (8μ) | ○ | ○ | 3.5 | 140 |
| Example 13 | Preparation Example-10 | MA-220 | 150 | ○ | ○ (8μ) | ○ | ○ | 3.5 | 140 |
| Example 14 | Preparation Example-11 | MA-220 | 145 | ○ | ○ (8μ) | ○ | ○ | 3.5 | 135 |
| Example 15 | Preparation Example-12 | MA-220 | 115 | ○ | ○ (8μ) | ○ | ○ | 3.5 | 110 |
| Example 16 | Preparation Example-1 | Asahi Thermal | 120 | ○ | ○ (8μ) | ○ | ○ | 3.5 | 107 |
| Example 17 | Preparation Example-1 | SP-250 | 140 | ○ | ○ (8μ) | ○ | ○ | 3.5 | 128 |
| Example 18 | Preparation Example-1 | SP-350 | 140 | ○ | ○ (8μ) | ○ | ○ | 3.5 | 128 |
| Example 19 | Preparation Example-1 | MA-11 | 130 | ○ | ○ (8μ) | ○ | ○ | 3.5 | 120 |
| Comparative Example 3 | Styrene/ acrylic acid resin *3 | MA-220 | 80 | x | x (15μ) | x | x | 2.8 | 80 |

*1: 20° Specular glossiness of carbon black dispersion
*2: 20° Specular glossiness of black resist
*3: Weight average Mw: 4,900, Acid value: 230

Preparation of Dispersion Resin

Preparation Example-13

32 g of tolylene diisocyanate trimer (Mitech GP 750A manufactured by Mitsubishi Chemical Corporation, resin solid content 50 wt %, a mixture of 2,4-form/2,6-form (=8/2), butyl acetate solution) and 0.02 g of dibutyltin dilaurate as a catalyst were diluted with 47 g of PGMEA (propylene glycol monomethylether acetate). Under stirring, 14.4 g of polycarprolactone of a number average molecular weight of 2,000 having a lauryl alkoxy group at one terminal and 9.6 g of polyoxytetramethylene glycol having a number average molecular weight of 1,000 were dropwise added to the above mixture, and the resultant mixture was reacted at 70° C. for 3 hours. Further, 1.6 g of 2-hydroxyethyl acrylate was dropwise added thereto, and the mixture was stirred for 3 hours. Thereafter, 1 g of N,N-dimethylamino-1,3-propane diamine was added therein, and the resultant mixture was further reacted at 40° C. for 1 hour.

A solution containing the dispersion resin thus obtained was measured with respect to its amine value by neutral- Preparation of Dispersion Resin Preparation Examples-14 to 16

Dispersion resins were prepared in the same manner as in PREPARATION EXAMPLE-13, except that compounds shown in Table 4 were used.

TABLE 4

|  | Dispersion resin | | | |
|---|---|---|---|---|
|  | Preparation Example-13 | Preparation Example-14 | Preparation Example-15 | Preparation Example-16 |
| TDI Trimer | 32 | 32 | 32 | 32 |
| PTMG1000 | 9.6 | 9.6 | 9.6 | 9.6 |
| PCL2000 (lauryl alcohol) *1 | 14.4 | | | |
| PCL2000 (HEA) *2 | | | 14.4 | 14.4 |
| PEG1000 (OMe) *3 | | 14.4 | | |
| N,N-dimethyl- | 2 | 2 | 2 | |

TABLE 4-continued

| | Dispersion resin | | | |
|---|---|---|---|---|
| | Preparation Example-13 | Preparation Example-14 | Preparation Example-15 | Preparation Example-16 |
| amino-1,3-propane diamine | | | | |
| 3-amino-1,2,4-triazole | | | | 0.8 |
| HEA | 1.6 | 0.8 | | 2.7 |
| PGMEA | 49 | 48 | 48 | 49 |
| Dibutyltin dilaurate | 0.02 | 0.02 | 0.02 | 0.02 |
| Weight average MW | 13000 | 15000 | 10500 | 8100 |
| Amine value (mgKOH/g) | 28 | 28 | 28 | 28 |
| Ethylenic unsaturated group equivalent (meq/g) | 0.32 | 0.15 | 0.32 | 0.55 |

TDI: tolylene diisocyanate
PTMG1000: polyoxytetramethylene glycol (Mn: 1000)
PCL2000 (lauryl alcohol) *1: polycaprolactone having lauryl alcohol at one terminal (Mn: 2000)
PCL2000 (HEA) *2: polycaprolactone having HEA at one terminal (Mn: 2000)
PEG1000 (OMe) *3: Polyethylene glycol having OMe at one terminal (Mn: 1000)
HEA: 2-hydroxyethyl acrylate
PGMEA: propylene glycol monomethyl ether acetate Examples 20 to 24
Preparation of Carbon Black Dispersion 50 parts by weight (solid content conversion) of each carbon black and 5 parts by weight (solid content conversion) of each dispersion resin shown in Table 5 were mixed with PGMEA so as to prepare a dispersion having a solid content concentration of 50 wt %. The weight of the dispersion was 50 g. This dispersion was fully stirred by a stirrer and was subjected to premixing.

Thereafter, the dispersion was subjected to dispersion treatment by a paint shaker at 25–45° C. for 8 hours. Beads employed were zirconia beads of 0.5 mmφ used in the same weight amount as that of the dispersion.

After finishing dispersion, the beads and the dispersion were separated by a filter.

Gloss Measurement of Carbon Black Dispersion

In order to evaluate the dispersed state of the above dispersion, a glossiness was measured in the following manner. When the dispersed state is satisfactory, the particle size of carbon black is small, and consequently diffused reflection is restrained, thereby producing a high glossiness. Thus, a dispersion having a higher glossiness provides a more satisfactorily dispersed state.

A dispersion was coated on a glass substrate by a spin coater, and was dried on a hot plate at 80° C. for 1 minute. This sample was measured with respect to a 20° specular glossiness ("Glossiness-1") by a gloss meter (manufactured by Bick Chemie Company).

Further, in order to evaluate a coating property of the dispersion, a viscosity property was measured. The viscosity property having a low thixotropy and close to a Newtonian fluid was evaluated as good (○), and the viscosity property having a high thixotropy was evaluated as bad (X). The results are shown in Table 5.

Preparation of Black Resist Composition

The above prepared carbon black dispersion and the following components were mixed so as to provide the following mixing ratio, and the resultant mixture was stirred by a stirrer and dissolved.

(1) Composition of Resist

| | | |
|---|---|---|
| a) | Binder resin (prepared in Preparation Example-2) | 25 g |
| b) | Acrylic monomer: dipentaerythritol hexaacrylate | 15 g |
| c) | Initiator (combination of 3 kinds) | |
| | c-1: 2-(2-chlorophenyl)-4,5-diphenylimidazole dimer | 2 g |
| | c-2: 4,4'-bis(diethylamino)benzophenone | 1.0 g |
| | c-3: 2-mercaptobenzothiazole | 1 g |
| d) | Pigment | 50 g |
| | Carbon black shown in Table 5 | |
| e) | Dispersion resin shown in Table 5 | 5 g |
| f) | Solvent | 300 g |
| | Propylene glycol monomethylether acetate | |

(2) Evaluation of Resist

The above prepared black resist composition was coated on a glass substrate (7059, manufactured by Corning Company) by a spin coater, and was dried at 80° C. on a hot plate for one minute. After drying, a coating thickness of the resist was measured by a profilometer (α-step, manufactured by Tencol Company) and was 1μ. After drying, a 20° specular glossiness ("Glossiness-2") of the resist film was measured by a gloss meter (manufactured by Bick Chemie Company).

Thereafter, this sample was exposed to light through a mask under a high pressure mercury lamp at 2,000 mj/cm² to form an image. The light-exposed sample was developed at a temperature of 25° C. for 1 minute by being dipped in an aqueous potassium hydroxide solution having a concentration of 0.05% to develop a resist pattern. The resist pattern thus developed was observed by a microscope of 200 times magnification to check a resolution. A resolution of not more than 10μ was expressed by ○ (good), and a resolution of exceeding 10μ was expressed by X (bad).

The results are shown in the following Table 5.

TABLE 5

| | Dispersion resin | Carbon black | Glossiness-1 *1 | Viscosity property | Resolution | Glossiness-2 *2 | OD |
|---|---|---|---|---|---|---|---|
| Example 20 | Preparation Example-13 | MA220 | 145 | ○ | ○ (8μ) | 135 | 3.5 |
| Example 21 | Preparation Example-14 | MA220 | 139 | ○ | ○ (8μ) | 128 | 3.5 |
| Example 22 | Preparation Example-15 | MA220 | 146 | ○ | ○ (8μ) | 135 | 3.5 |
| Example 23 | Preparation Example-16 | MA220 | 129 | ○ | ○ (10μ) | 120 | 3.5 |

TABLE 5-continued

| | Dispersion resin | Carbon black | Glossiness-1 *1 | Viscosity property | Resolution | Glossiness-2 *2 | OD |
|---|---|---|---|---|---|---|---|
| Example 24 | Preparation Example-13 | Asahi Thermal | 120 | ○ | ○ (8μ) | 110 | 3.5 |

*1: 20° Specular glossiness of carbon black dispersion
*2: 20° Specular glossiness of black resist

Examples 25 to 33
(1) Composition of Resist a) Binder resin — 25 g
    (prepared in Preparation Example-2)
b) Acrylic monomer: dipentaerythritol hexaacrylate — 15 g
c) Initiator (combination of 3 kinds)

c-1: 2-(2-chlorophenyl)-4,5-diphenylimidazole dimer — 2 g
   c-2: 4,4'-bis(diethylamino)benzophenone — 1.0 g
   c-3: 2-mercaptobenzothiazole — 1 g
d) Pigment — 50 g
    Carbon black shown in Table 6
e) High molecular dispersants shown in Table 6 — 5 g
f) Solvent — 300 g
    Propylene glycol monomethylether acetate

TABLE 6

Composition of Carbon Black Dispersion

| Dispersion No. | Carbon Black | High molecular dispersant |
|---|---|---|
| 1 | Ashai Thermal (Asahi Carbon Co.) | S 24000 *1 |
| 2 | Asahi Thermal (Asahi Carbon Co.) | Byk 160 *2 |
| 3 | Asahi Thermal (Asahi Carbon Co.) | Byk 161 *3 |
| 4 | MA 220 (Mitsubishi Chemical Corporation) | S 24000 |
| 5 | MA 220 | Byk 160 |
| 6 | MA 220 | Byk 161 |
| 13 | Special Black 350 (Degussa, Inc.) | Byk 182 *4 |
| 14 | Special Black 250 (Degussa, Inc.) | Byk 182 |
| 15 | MA 11 Mitsubishi Chemical Corporation) | Byk 182 |

*1 SOLSPERSE 24000 (Zeneca Co.) Polyester type, Amine value 35
*2 Disperbyk 160 (Bick Chemie Co.) Polyester polyol type, amine value 12
*3 Disperbyk 161 (Bick Chemie Co.) Polyester polyol type, amine value 11
*4 Disperbyk 182 (Bick Chemie Co.) Polyether type, amine value 14

Preparation of Black Resist Composition 1 part (125 g) of the above solvent was added to the above binder resin, pigment (carbon black) and high molecular dispersant, and the resultant mixture was stirred to prepare a mill base. This was subjected to dispersion treatment by a paint shaker. Zirconia beads of a particle size of 0.5 mm were used, and the resultant mixture was subjected to dispersion treatment at room temperature for 4 hours. Thereafter, the remaining components were added thereto, and the resultant mixture was stirred and mixed. The mixture was then filtrated by a membrane filter of 10μ to obtain a black resist composition.

(2) Evaluation of Resist

The above prepared black resist composition was coated on a glass substrate by a spin coater, and was dried at 80° C. on a hot plate for one minute. After drying, a coating thickness of the resist was 1μ. After drying, a 20° specular glossiness of the resist film was measured by a gloss meter (manufactured by Bick Chemie Company). Also, coating non-uniformity was visually observed and evaluated. As this result, a uniform coating was expressed by ○ (good), and a non-uniform coating was expressed by X (bad). Further, an optical density (OD) was measured by a Macbeth reflection densitometer TR 927 (manufactured by Cormorgun Company). Thereafter, this sample was exposed to light through a mask under a high pressure mercury lamp at 2,000 mj/cm$^2$ to form an image. The light-exposed sample was developed at a temperature of 25° C. for various times by being dipped in an aqueous potassium hydroxide solution having a concentration of 0.05% to develop a resist pattern. The resist pattern thus developed was observed by a microscope to check a resolution. A resolution of not more than 10μ was expressed by ○ (good), and a resolution of exceeding 10μ was expressed by X (bad). Further, an adhesiveness was evaluated by adhesive cellophane tape test, and when the resist pattern was not peeled, it was evaluated as good (○) and when the resist pattern was peeled, it was evaluated as bad (X).

Further, the black resist composition was allowed to stand at room temperature for one day, and the image-formation was carried out in the same manner as above. The stability of the composition of forming a resist pattern of not more than 10μ was evaluated as good (○), and the stability of the composition of not forming a resist pattern of not more than 10μ was evaluated as bad (X).

The results are shown in the following Table 7.

TABLE 7

| | Dispersion No. | Coating non-uniformity | Resolution | Adhesiveness | Stability | OD | 20° specular Glossiness |
|---|---|---|---|---|---|---|---|
| Example 25 | 1 | ○ | ○ (8μ) | ○ | ○ | 3.5 | 110 |
| Example 26 | 2 | ○ | ○ (8μ) | ○ | ○ | 3.5 | 101 |
| Example 27 | 3 | ○ | ○ (8μ) | ○ | ○ | 3.5 | 105 |
| Example 28 | 4 | ○ | ○ (8μ) | ○ | ○ | 3.5 | 137 |
| Example 29 | 5 | ○ | ○ (8μ) | ○ | ○ | 3.5 | 130 |
| Example 30 | 6 | ○ | ○ (8μ) | ○ | ○ | 3.5 | 142 |

TABLE 7-continued

|  | Dispersion No. | Coating non-uniformity | Resolution | Adhesiveness | Stability | OD | 20° specular Glossiness |
|---|---|---|---|---|---|---|---|
| Example 31 | 13 | ○ | ○ (8µ) | ○ | ○ | 3.6 | 195 |
| Example 32 | 14 | ○ | ○ (8µ) | ○ | ○ | 3.6 | 185 |
| Example 33 | 15 | ○ | ○ (8µ) | ○ | ○ | 3.6 | 185 |

Example 34

Preparation of Color Filter

In order to prepare a color filter, a color resist photosensitive composition for forming red (R), green (G) and blue (B) picture elements was prepared in the following manner.

(Preparation of Red, Blue and Green Inks)

Red Ink 20 g of a red pigment (diketopyrrolopyrole PR-254), 5 g of a yellow pigment (isoindoline yellow PY-139), 5 g of a high molecular dispersant BYK-161 (Bick Chemie Company) and 70 g of PGMEA were subjected to premixing by fully stirring with a stirrer.

Thereafter, the resultant mixture was subjected to dispersion treatment at 25–45° C. for 6 hours by a paint shaker. Zirconia beads of 0.5 mmφ were added to the mixture in the same weight amount as that of the dispersion. After finishing dispersion, beads were separated from the dispersion by a filter.

Blue Ink 25 g of a blue pigment (phthalocyanine blue PB-15; 3), 5 g of a high molecular dispersant BYK-161 (Bick Chemie Company) and 70 g of PGMEA were subjected to premixing by fully mixing by a stirrer. The dispersion treatment was carried out in the same manner as in the treatment of the above red ink.

Green Ink 20 g of a green pigment (phthalocyanine green PG-36), 5 g of a yellow pigment (isoindoline yellow PY-139), 5 g of a high molecular dispersant BYK-161 (Bick Chemie Company) and 70 g of PGMEA were subjected to premixing by fully stirring by a stirrer. The dispersion treatment was carried out in the same manner as in the treatment of the above red ink.

Preparation of Color Resist Composition

Each color resist photosensitive composition was prepared by mixing the above prepared color ink and the following components so as to provide the following mixing ratio.

| a) | Binder resin (prepared in Preparation Example-2) | 25 g |
|---|---|---|
| b) | Acrylic monomer: dipentaerythritol hexaacrylate | 15 g |
| c) | Initiator (combination of 3 kinds) | |
| | c-1: 2-(2-chlorophenyl)-4,5-diphenylimidazole dimer | 2 g |
| | c-2: 4,4'-bis(diethylamino)benzophenone | 1.0 g |
| | c-3: 2-mercaptobenzothiazole | 1 g |
| d) | Additives | |
| | Maleic anhydride | 1 g |
| | FC-430 (leveling agent manufactured by Sumitomo 3M Company) | 100 ppm |
| e) | Pigment | 70 g |
| | The above prepared pigment inks (red, blue or green) | |
| f) | Solvent | 270 g |
| | Propylene glycol monomethylether acetate | |

The above components were uniformly stirred by a stirrer, and the resultant mixture was filtrated by a Teflon-made membrane filter of 0.5µ.

Preparation of Color Filter

The black resist composition of Example 1 was coated on a glass plate (7059 manufactured by Corning Company) having a size of 300×400 mm and a thickness of 1.1 mm, and was dried on a hot plate at 80° C. for 1 minute. Under this condition, a dry coating thickness of the black resist was measured by a profilometer (α-step, manufactured by Tencol Company) and was 1.0µ. A 20° specular glossiness of the resist film was 138 and an optical density (OD) was 3.5.

Thereafter, this sample was exposed to light through a chromium mask having a transparent lattice-like pattern having a line width of 25µ by a light-exposure apparatus having a high pressure mercury lamp at a light-exposure amount of 2,000 mj/cm². The light-exposed sample was subjected to spray development using an aqueous potassium hydroxide solution having a concentration of 0.05% at a temperature of 25° C. for 50 seconds, and the developed sample was fully rinsed with a pure water.

The sample was then subjected to post baking at 200° C. for 20 minutes in a convection oven. A 20° specular glossiness and an optical density measured after post baking were the same as those measured after prebaking. Also, an edge part of the resin black matrix thus formed was observed by an optical microscope of 200 times magnification, and was found to be very sharp, and it was proved that there were no defects such as pinholes.

The above prepared red resist composition was coated on this sample by a spin coater, and was dried on a hot plate at 80° C. for 1 minute. A coating thickness of the red resist was 1.5µ on a glass substrate without the resin black matrix. Thereafter, this sample having a red resist coating was exposed to light through a chromium mask having a transparent stripe pattern of a line width of 100µ by a light-exposure apparatus having a high pressure mercury lamp at a light-exposure amount of 200 mj/cm². The light-exposed sample was subjected to spray development by using an aqueous potassium hydroxide solution having a concentration of 0.05% at 25° C. for 50 seconds, and the developed sample was fully rinsed with pure water.

The sample was then subjected to post baking at 200° C. for 20 minutes in a convection oven. The red pattern thus formed was observed by an optical microscope of 200 magnification, and was found to be very sharp. Even after forming the red pattern, no damages such as peeling off and surface roughness were not caused on the resin black matrix and the initial 20° specular glossiness value was maintained.

In the same manner as above, blue and green resist patterns were respectively formed. After forming all of red, blue and green patterns, the edge part of the resin black matrix was observed by an optical microscope of 200 times magnification, and was found to be very sharp, and it was proved that there were no defects including pin hole and the like. Also, the initial 20° specular glossiness value was maintained.

The color filter having the resin black matrix prepared as mentioned above, had an excellent size accuracy and a satisfactory pattern edge sharpness, and had no defects including pinholes and the like.

Thus, by using this color filter, a liquid crystal display device having a satisfactory image quality could be produced.

In the preparation of a color filter in accordance of EXAMPLE 34, it was possible to satisfactorily prepare a color filter by using a black resist other than that of Example 1, and it was also possible to satisfactorily produce a liquid crystal display device of a satisfactory image quality by using the color filter thus prepared.

We claim:

1. A color filter having a resin black matrix on a transparent substrate, wherein the resin black matrix has a 20° specular glossiness of from 100 to 200.

2. The color filter according to claim 1, wherein the resin black matrix has an optical density of at least 2.8.

3. The color filter according to claim 1, wherein the resin black matrix has an optical density of at least 3.0.

4. The color filter according to claim 1, wherein the 20° specular glossiness is from 120 to 200.

5. The color filter according to claim 1, wherein the resin black matrix contains carbon black as a black pigment.

6. A black resist composition for a color filter, which comprises a black pigment, a photosensitive resin material and a solvent, wherein its dry coating film has a 20° specular glossiness of from 100 to 200.

7. The black resist composition for a color filter according to claim 6, wherein a viscosity at 25° C. is in the range of from 2 to 20 mPs and a viscosity ratio $\eta 5/\eta 50$ of viscosities measured respectively at 5 rpm and 50 rpm revolutions is from 1 to 1.5.

8. The black resist composition for a color filter according to claim 6, wherein a pigment dispersant is further contained.

9. The black resist composition for a color filter according to claim 8, wherein the pigment dispersant is a high molecular dispersant having a basic functional group and having at least one of polyester and polyether structures.

10. The black resist composition for a color filter according to claim 8, wherein the pigment dispersant is a dispersion resin prepared by reacting at least a polyisocyanate compound, a compound having at least one hydroxyl group in the same molecule and a compound having an active hydrogen and a tertiary amino group in the same molecule.

11. The black resist composition for a color filter according to claim 10, wherein the compound having at least one hydroxyl group in the same molecule has a number average molecular weight of from 300 to 10,000.

12. The black resist composition for a color filter according to claim 10, wherein the compound having at least one hydroxyl group in the same molecule is a compound having 1 or 2 hydroxyl groups.

13. The black resist composition for a color filter according to claim 10, wherein the polyisocyanate compound is an organic diisocyanate trimer.

14. The black resist composition for a color filter according to claim 10, wherein the polyisocyanate compound is a tolylene diisocyanate trimer and/or an isophorone diisocyanate trimer.

15. The black resist composition for a color filter according to claim 10, wherein the compound having at least one hydroxyl group in the same molecule is polyether glycol and/or polyester glycol.

16. The black resist composition for a color filter according to claim 10, wherein the compound having at least one hydroxyl group in the same molecule is at least one member selected from the group consisting of polypropylene glycol, polyethylene glycol, polyoxytetramethylene glycol, their compounds having one terminal hydroxyl group alkoxylated with a $C_1$–$C_{25}$ alkyl group, polycaprolactone glycol and polycaprolactone using a $C_1$–$C_{25}$ alcohol as an initiator.

17. The black resist composition for a color filter according to claim 10, wherein the compound having an active hydrogen and a tertiary amino group has a tertiary amino group of a $C_1$–$C_4$ alkyl group and/or a heterocyclic structure.

18. The black resist composition for a color filter according to claim 17, wherein the heterocyclic ring is an imidazole ring or a triazole ring.

19. The black resist composition for a color filter according to claim 10, wherein the dispersion resin has a side chain containing an ethylenic unsaturated group.

20. The black resist composition for a color filter according to claim 19, wherein the dispersion resin is prepared by reacting a compound having an active hydrogen and an ethylenic unsaturated group in the same molecule with a polyisocyanate compound, a compound having at least one hydroxyl group in the same molecule and a compound having an active hydrogen and a tertiary amino group in the same molecule.

21. The black resist composition for a color filter according to claim 19, wherein the ethylenic unsaturated group of the dispersion resin is an acryl group or a methacryl group.

22. The black resist composition for a color filter according to claim 19, wherein the dispersion resin has an ethylenic unsaturated group equivalent of from 0.01 to 3 meq/g.

23. The black resist composition for a color filter according to claim 10, wherein the dispersion resin has a weight average molecular weight of from 1,000 to 200,000 in terms of polystyrene conversion measured by GPC.

24. The black resist composition for a color filter according to claim 8, wherein the pigment dispersant has an amine value of from 1 to 100 mgKOH/g.

25. The black resist composition for a color filter according to claim 6, wherein the black pigment is carbon black.

26. The black resist composition for a color filter according to claim 25, wherein the carbon black has a specific surface area of at most 110 $m^2$/g and a pH of from 2 to 9.

27. The black resist composition for a color filter according to claim 6, wherein the photosensitive resin material contains a binder resin, a photo-initiator and a monomer polymerizable by the photo-initiator.

28. The black resist composition for a color filter according to claim 27, wherein the binder resin contains an acrylic resin having a carboxyl group as at least one part of its structure unit.

29. The black resist composition for a color filter according to claim 6, wherein a pigment concentration in the total solid content in the composition is from 25 to 70 wt %.

30. The black resist composition for a color filter according to claim 6, wherein an optical density is at least 2.8.

31. A black resist composition for a color filter, which comprises a binder resin, a photo-initiator, a monomer polymerizable by the photo-initiator, a black pigment and a dispersant, wherein the dispersant is a high molecular dispersant comprising a polyester or a polyether and having a basic functional group.

32. A black resist composition for a color filter, which comprises a binder resin, a photo-initiator, a monomer polymerizable by the photo-initiator, a black pigment and a dispersant, wherein the dispersant is a dispersion resin prepared by reacting a polyisocyanate compound, a compound having at least one hydroxyl group in the same molecule and a compound having an active hydrogen and a tertiary amino group in the same molecule.

33. A black resist composition for a color filter, which comprises a pigment and a dispersant, wherein the dispersant is a dispersion resin prepared by reacting a polyisocyanate compound, a compound having at least one hydroxyl group in the same molecule, a compound having an active hydrogen and a tertiary amino group in the same molecule and a compound having an active hydrogen and an ethylenic unsaturated group in the same molecule.

* * * * *